(12) United States Patent
Burgess

(10) Patent No.: US 7,047,285 B2
(45) Date of Patent: May 16, 2006

(54) SYSTEM AND METHOD FOR PROVIDING A UNIFIED MESSAGING SCHEME IN A MOBILE DEVICE

(75) Inventor: Gregory M. Burgess, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 702 days.

(21) Appl. No.: 09/785,861

(22) Filed: Feb. 16, 2001

(65) Prior Publication Data

US 2002/0116530 A1 Aug. 22, 2002

(51) Int. Cl.
*G06F 15/177* (2006.01)

(52) U.S. Cl. ............... 709/220; 455/412.1; 455/550.1; 455/552.1; 455/557

(58) Field of Classification Search ............... 709/211, 709/206, 203, 227
See application file for complete search history.

(56) References Cited

U.S. PATENT DOCUMENTS

| | | | |
|---|---|---|---|
| 5,406,557 A | 4/1995 | Baudoin | 370/61 |
| 5,627,997 A | 5/1997 | Pearson et al. | 395/500 |
| 5,848,415 A * | 12/1998 | Guck | 707/10 |
| 5,961,590 A | 10/1999 | Mendez et al. | 709/206 |
| 6,023,708 A * | 2/2000 | Mendez et al. | 707/203 |
| 6,029,143 A * | 2/2000 | Mosher et al. | 705/28 |
| 6,035,327 A | 3/2000 | Buckley et al. | 709/206 |
| 6,057,841 A | 5/2000 | Thurlow et al. | 345/347 |
| 6,134,582 A * | 10/2000 | Kennedy | 709/206 |
| 6,212,550 B1 * | 4/2001 | Segur | 709/206 |

(Continued)

FOREIGN PATENT DOCUMENTS

| | | |
|---|---|---|
| EP | 1 039 768 A2 | 9/2000 |
| WO | WO 97/22928 | 6/1997 |

OTHER PUBLICATIONS

Vaananen-Vainio-Mattila et al., "Designing Mobile Phones and Communicators for Consumers' Needs at Nokia," *interactions 6, 5*, 1999, pp. 23-26.

Sheldon, Tom, "Mapi Blooms in Chicago", Byte, No. 11, Nov. 11, 1994, pp. 163-164 and 166-169.

(Continued)

*Primary Examiner*—Bunjob Jaroenchonwanit
*Assistant Examiner*—Dohm Chankong
(74) *Attorney, Agent, or Firm*—Merchant & Gould P.C.

(57) ABSTRACT

Described is a system and method for receiving and distributing messages within a mobile device using multiple communication protocols. The invention provides a method for centrally controlling data flow throughout the communication system. The invention provides a means to receive a message over a communications medium, translate it to a first format for general use and further translate it to a second format for data storage. In one implementation, a data storage component communicates with an application, a form, a transport, and a data store. The application, the form, and the transport each communicate with the storage component by passing properties of a message to the storage component in a first format. The storage component translates the properties from the first format to a second format. The storage component then stores the translated properties in the data store in the second format.

30 Claims, 11 Drawing Sheets

U.S. PATENT DOCUMENTS

| | | | | |
|---|---|---|---|---|
| 6,292,795 B1 | * | 9/2001 | Peters et al. | 707/3 |
| 6,330,589 B1 | * | 12/2001 | Kennedy | 709/206 |
| 6,563,919 B1 | * | 5/2003 | Aravamudhan et al. | 379/230 |
| 6,615,241 B1 | * | 9/2003 | Miller et al. | 709/206 |

OTHER PUBLICATIONS

De Herrera, Chris, "Inside Windows CE 1.0, 2.x", CEWindows.net, Version 1.04, May 1, 1998, 2 pages.

* cited by examiner

US 7,047,285 B2

SYSTEM AND METHOD FOR PROVIDING A UNIFIED MESSAGING SCHEME IN A MOBILE DEVICE

FIELD OF THE INVENTION

The present invention relates generally to computer-executable software, and more particularly to sending a message across multiple transport protocols.

BACKGROUND OF THE INVENTION

Consumer electronics of almost any size now include controllers or processors and perform many functions that used to be exclusively within the domain of the desktop computer. One such device, the cellular phone, previously dedicated to transmitting only voice communication, is now being utilized to transmit other data in addition to voice communication. Some cellular phones now allow users to connect to the Internet and browse web sites; other cellular phones now allow users to check and send email. However, power consumption and available memory of mobile devices place size and resource constraints on mobile devices that do not exist on desktop computers.

Many different options are available for sending and receiving messages and their accompanying data. Due to the different standards and methods it has become more challenging to send and receive messages in the environment of mobile communications technology.

Until now, the size and resource constraints of mobile devices have made an acceptable communications mechanism unascertainable to the developers of mobile communications.

SUMMARY OF THE INVENTION

The present invention provides a system and method for receiving and distributing messages using multiple communication protocols at a mobile device. The invention provides a method for centrally controlling data flow throughout the communication system. The invention provides a means to receive a message over a communications medium, translate it to a first format for general use, and further translate it to a second format for data storage.

In one aspect of the invention, a data storage component is in communication with an application, a form, a transport, and a data store. The application, the form, and the transport each communicate with the storage component by passing properties of a message to the storage component in a first format. The storage component translates the properties from the first format to a second format. The storage component then stores the translated properties in the data store in the second format.

The invention simplifies controlling a messaging system by dividing particular functionality among several components rather than integrating all the functionality in a single component. This simplification improves the ability of outside vendors to add new components to the system. Among other advantages, the present invention achieves increased efficiency by being built around a centralized storage component that controls translation and information flow.

DETAILED DESCRIPTION OF THE PREFERRED EMBODIMENT

The present invention provides a system and method for facilitating the organization of electronic devices. Among other things, disclosed is a protocol designed to organize the reception and distribution of messages received via different communication formats. The protocol allows messages received and translated from different communication formats to a standard format to be mapped to an internal format for data storage. This mapping to the internal format reduces the memory requirement and allows the remaining components to operate in the standard format thereby facilitating future development from outside sources.

Illustrative Operating Environment

Figure 1:
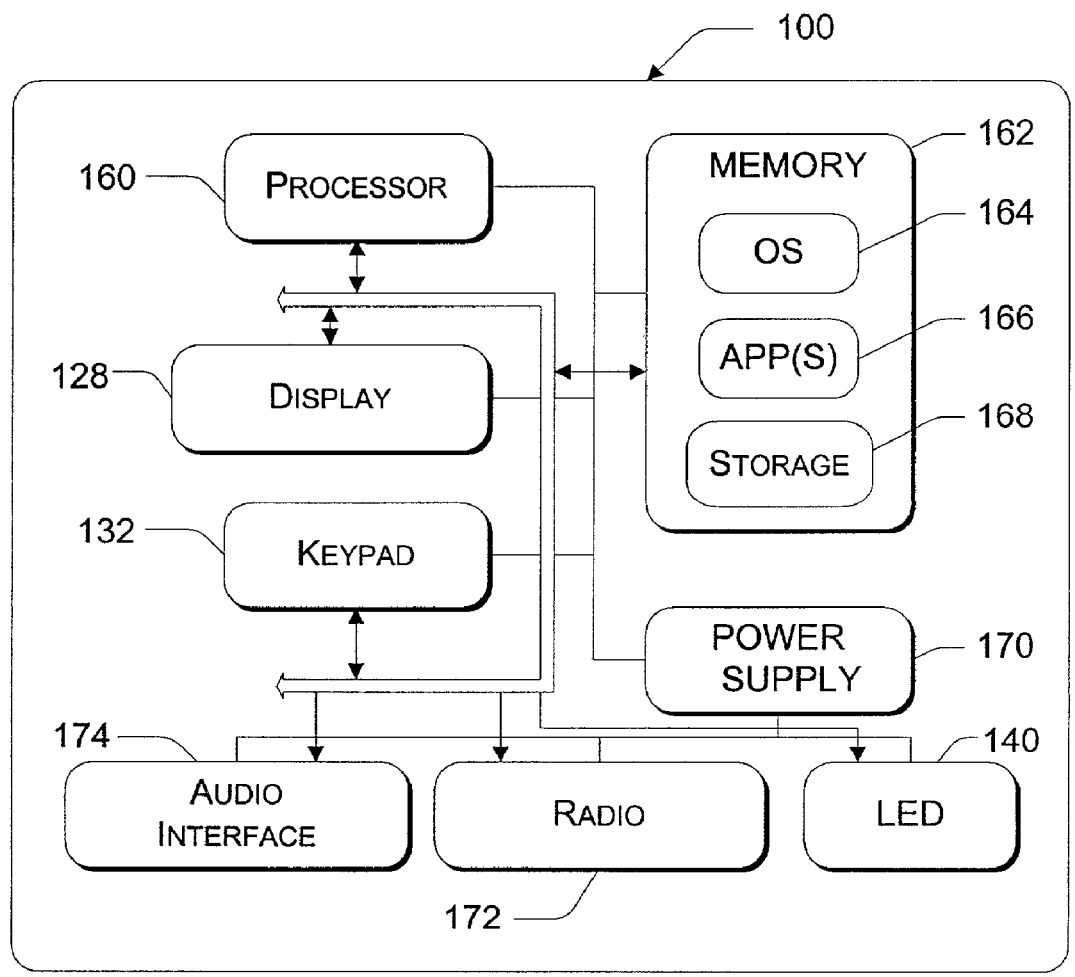
FIG. 1 is a functional block diagram illustrating functional components of a mobile computing device that may be adapted to implement one embodiment of the present invention.

FIG. 1 is a functional block diagram illustrating functional components of a mobile computing device 100. The mobile computing device 100 has a processor 160, a memory 162, a display 128, and a keypad 132. The memory 162 generally includes both volatile memory (e.g., RAM) and non-volatile memory (e.g., ROM, Flash Memory, or the like). The mobile computing device 100 includes an operating system 164, such as the Windows CE operating system from Microsoft Corporation or other operating system, which is resident in the memory 162 and executes on the processor 160. The keypad 132 may be a push button numeric dialing pad (such as on a typical telephone), a multi-key keyboard (such as a conventional keyboard), or other such input device, which would function in the required fashion. The display 128 may be a liquid crystal display, or any other type of display commonly used in mobile computing devices. The display 128 may be touch sensitive, and would then also act as an input device.

One or more application programs 166 are loaded into memory 162 and run on the operating system 164. Examples of application programs include phone dialer programs, email programs, scheduling programs, PIM (personal information management) programs, word processing programs, spreadsheet programs, Internet browser programs, and so forth. The mobile computing device 100 also includes non-volatile storage 168 within the memory 162. The non-volatile storage 168 may be used to store persistent information which should not be lost if the mobile computing device 100 is powered down. The applications 166 may use and store information in the storage 168, such as e-mail or other messages used by an e-mail application, contact information used by a PIM, appointment information used by a scheduling program, documents used by a word processing application, and the like. A synchronization application also resides on the mobile device and is programmed to interact with a corresponding synchronization application resident on a host computer to keep the information stored in the storage 168 synchronized with corresponding information stored at the host computer.

The mobile computing device 100 has a power supply 170, which may be implemented as one or more batteries. The power supply 170 might further include an external power source, such as an AC adapter or a powered docking cradle that supplements or recharges the batteries.

The mobile computing device 100 is also shown with two types of external notification mechanisms: a LED 140 and an audio interface 174. These devices may be directly coupled to the power supply 170 so that when activated, they remain on for a duration dictated by the notification mechanism even though the processor 160 and other components might shut down to conserve battery power. The LED 140 may be programmed to remain on indefinitely until the user takes action to indicate the powered-on status of the device. The audio interface 174 is used to provide audible signals to and receive audible signals from the user. For example, the audio interface 174 may be coupled to a speaker for providing audible output and to a microphone for receiving audible input, such as to facilitate a telephone conversation.

The mobile computing device 100 also includes a radio 172 that performs the function of transmitting and receiving radio frequency communications. The radio 172 facilitates wireless connectivity between the mobile computing device 100 and the outside world, via a communications carrier or service provider. Transmissions to and from the radio 172 are conducted under control of the operating system 164. In other words, communications received by the radio 172 may be disseminated to application programs 166 via the operating system 164, and vice versa.

Illustrative Message Organizing System

Figure 2:
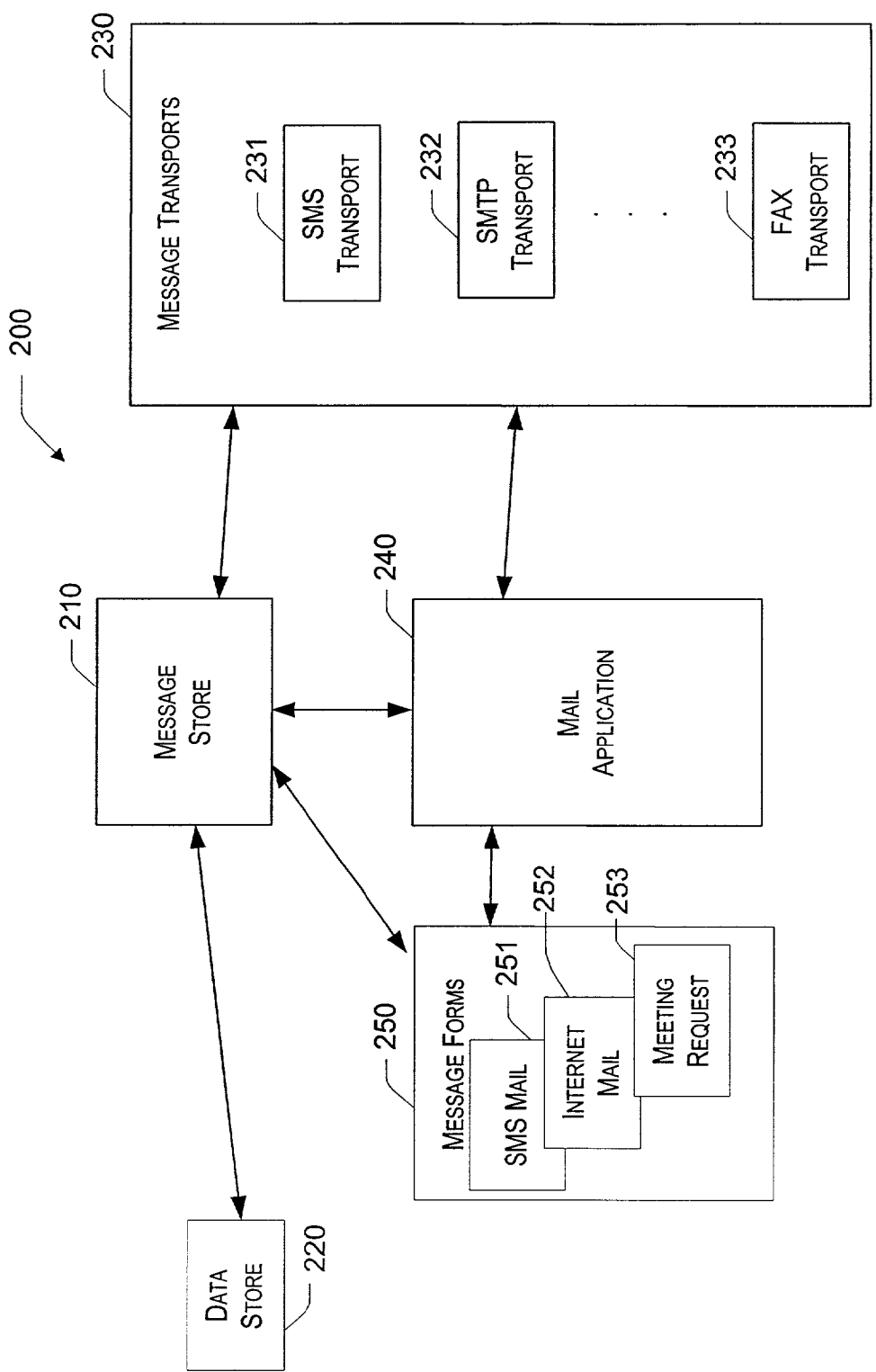
FIG. 2 is a functional block diagram illustrating a system adapted to organize and distribute messages in accordance with one implementation of the present invention.

FIG. 2 is a functional block diagram illustrating a system adapted to organize and distribute messages through an appropriate mapping protocol, according to one embodiment of the invention. Messaging system 200 includes message store 210, data store 220, transport component 230, mail application 240, and message form component 250. The transport component further includes transports 231, 232, and 233. Although only three transports are shown, it will be understood that more transports could be added or transports could be removed without departing from the spirit and scope of the invention. The message form component 250 further includes several message forms, such as SMS mail form 251, Internet mail form 252, and meeting request form 253. In this implementation, each message form 250 is associated with a particular class of communications message. For example, the SMS mail form 251 is associated with incoming messages delivered over the SMS transport 231. Although only three message forms are shown, it will be understood that more message forms could be added or message forms could be removed without departing from the spirit and scope of the invention.

Message store 210 is illustrated in detail in FIG. 4 and described below. Briefly described, the message store, 210 is a software component that maps message traffic in one message format (e.g., MAPI) to another format (e.g. Windows CE database format) for storage. Additionally, the message store 210 notifies the other component of other events that occur in system 200, such as creation, modification, or deletion of a message object.

Data store 220 is illustrated in detail in FIG. 3 and described below. Briefly described, the data store, 220 is a software component, which acts as a storage area for messages. The data store 220 receives and stores message object data from the message store 210 in a format consistent with the underlying data storage mechanism, in this case a Windows CE Database. Alternatively, other possible database formats may be used including a text file, Access, SQL, and the like.

The transport component 230 includes several specialized message transports, each programmed to communicate with local components in MAPI format, and with external devices via particular protocols (e.g., SMS, SMTP, IMAP, POP, FAX, etc.). For example, SMS transport 231 is a software component interfaced to receive messages in SMS format. SMTP transport 232 is another software component, interfaced to transmit messages in SMTP format. Additional transports 233 might be interfaced to receive any of several different communication formats such as, for example, fax data transmission, POP3, IMAP, or the like.

Mail application 240 is a software component that acts as a principal interface between the user and the system. The application is programmed to control a special function, such as e-mail usage or contacts maintenance. It should be noted that while the user primarily interfaces with the messaging system 200 through the mail application 240, there may be numerous applications running concurrently with the mail application, such as, a word processor, calendar, etc. These other applications are not detailed here, as they are not pertinent to the present invention, as it exists in its present form, although they may support it or be supported by it presently or in the future.

The message form component 250 is a group of special display forms that each perform a specialized function. In other words, each message form is a software component that may be programmed to either display information for or to receive information from the user. For instance, SMS message form 251 allows the viewer to receive and to view SMS messages. Likewise, standard Internet message form 252 is a message form that allows the user to receive and to view standard Internet messages. Similarly, meeting request message form 253 is a message form that allows users to request meetings. Any number of other message forms might represent any number of different messages that may be received, such as, for example, a fax message, voice mail notifications, and the like.

Each of the several components, except the data store 220, communicate with each other using a standardized messaging protocol, such as MAPI or a subset of MAPI. However, the data store 220, as mentioned above, communicates in accordance with a native format of the operating system. In this embodiment, using the native format of the operating system avoids the need to create new, specialized data storage mechanisms specifically for the messaging system 200. This feature provides the advantage of reducing the duplication of resources, which helps conserve space.

Figure 3:
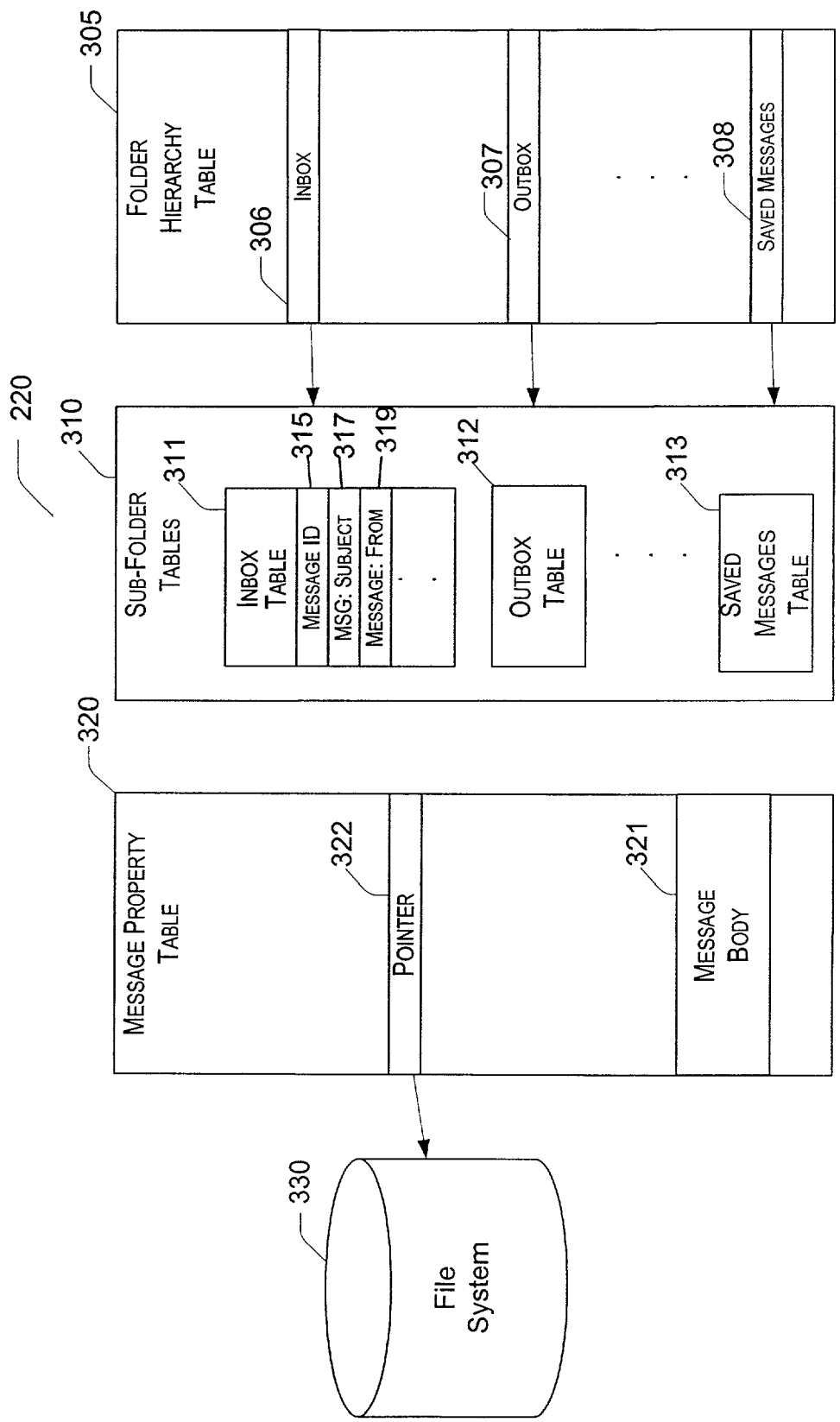
FIG. 3 is a functional block diagram illustrating a data storage component in accordance with one implementation of the present invention.

FIG. 3 is a functional block diagram illustrating in greater detail the data store 220 according to one embodiment of the invention. Data store 220 includes folder hierarchy table 305, sub-folder tables 310, a message property table 320, and file system 330. Each of these components will be described below, in detail.

Folder hierarchy table 305 is a software component organized to identify and maintain the hierarchy of the several message folders that may be used by the system. Folder hierarchy table 305 includes pointers to each of the several sub-folder tables. For instance, the inbox entry 306 in folder hierarchy table 305 points to the inbox table 311 of sub-folder tables 310. Likewise, the outbox entry 307 in folder hierarchy table 305 points to the outbox table 312 of sub-folder tables 310. Similarly, the saved messages entry 308 in folder hierarchy table 305 points to the saved messages table 312 of sub-folder tables 310. Any number of other entries listed in folder hierarchy table 305 would have a corresponding folder located in sub-folder tables 310. Such entries/sub-folders might include deleted messages, user-defined folders and sub-folders, and the like.

Sub-folder tables 310 is essentially a group of tables used for storing properties of each message while each message remains in the messaging system 220. In this implementation, separate tables are used to represent each sub-folder in the folder hierarchy. In this implementation, each sub-folder is interfaced to receive message data in the native format of the operating system. Additionally, each sub-folder receives and stores specific properties of a message from the message store 210. Each sub-folder table is configured to store a subset of the properties for each message. The subset of the properties selected to be stored in the sub-folder tables is based on which properties are needed to display the contents of the folder in the messaging application. For example, the inbox table 311 may include a message ID property 315 that uniquely identifies each message, a subject property 317 that includes text to display in a subject line of a message, a from property 319 that identifies a sender of the message, and the like. Specific properties of a message stored in the sub-folder tables may include from, subject, date, and the like. Although only three tables are shown, it will be understood that more tables could be added or tables could be removed without departing from the spirit and scope of the invention. By including only a subset of properties in the sub-folders, rather than all the properties, the present invention realizes significant performance advantage.

The message property table 320 is interfaced to receive message data in the native format of the operating system, and receives and stores specific properties of a message not stored in the sub-folder tables 310. In one embodiment, the message property table 320 receives data not stored in the sub-folder tables 310. In other words, the message property table 320 acts as overflow storage for the sub-folder tables 310. Message properties stored in message property table 320 may include message body 321, attachments, and the like. Although only a single message body is shown, it will be understood that more message bodies or other properties could be added without departing from the spirit and scope of the invention. Properties too large to be stored in the message property table 320 are instead stored in the file system 330. However, the property identification ("ID") and its location in the file system are recorded in pointer 322. Additionally, although only a single pointer is shown, it will be understood that more pointers could be added without departing from the spirit and scope of the invention.

The file system 330 is a data storage mechanism used by the operating system to store computer-readable files. Generally, the file system 330 is used to store message data that is too large to store within the message property table 320.

Figure 4:
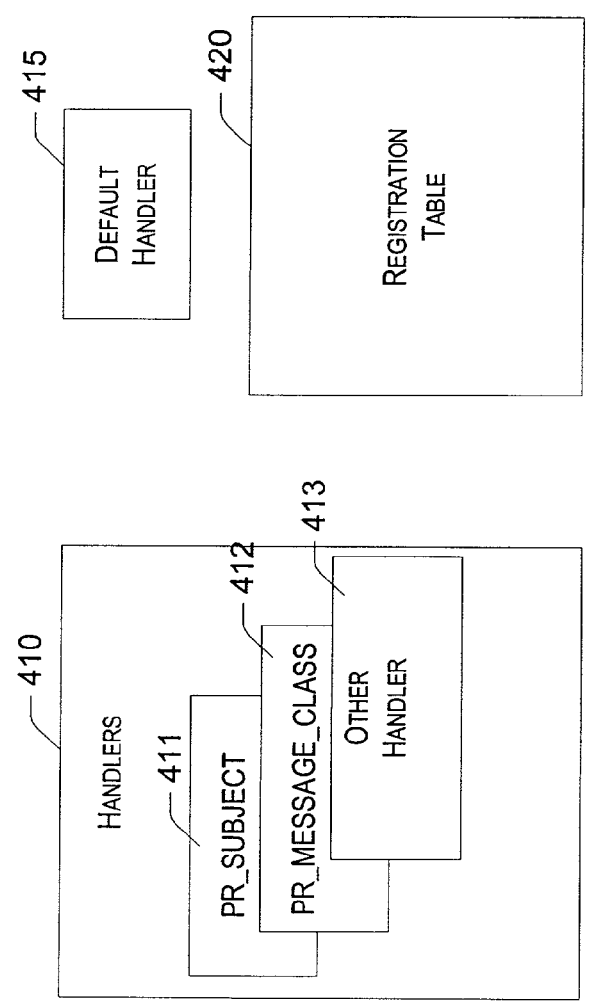
FIG. 4 is a functional block diagram illustrating a message store component in accordance with one implementation of the present invention.

FIG. 4 is a functional block diagram illustrating in greater detail the message store component 210 according to one embodiment of the invention. Message store component 210 includes handler component 410, default handler 415, and registration table 420. Handler component 410 further includes handlers 411, 412, and 413. Although only three handlers are shown, it will be understood that more handlers could be added or handlers could be removed without departing from the spirit and scope of the invention.

Handler component 410 includes several handlers, each of which is a software component that translates properties of one type, such as MAPI, to another type, such as Windows CE database format. For example, handler 411 may be programmed to translate the property "subject" of a message from MAPI format to Windows CE database format. Another example may be message class handler 412 being used to retrieve a numerical identifier stored within the message object, lookup a message class string associated with the particular numerical identifier, and return the message class string to the calling process. Additional handlers 413 might represent any number of different handlers registered to translate specific properties of a message from MAPI to Windows CE database format, such as, for example, from, date received, attachment notice, or the like. Default handler 415 is similar to the other handlers, but is called when the message store 210 is unable to recognize the category of the property to be translated. Default handler 415 translates the property into a generic property form to allow storage in the data store 220.

Registration table 420 is a registration database that includes a listing of registered handlers 410 and the specific message property types that they are registered to translate. The default handler 415 may be registered in the registration table 420 to handle property types that are otherwise not handled.

Figure 5:
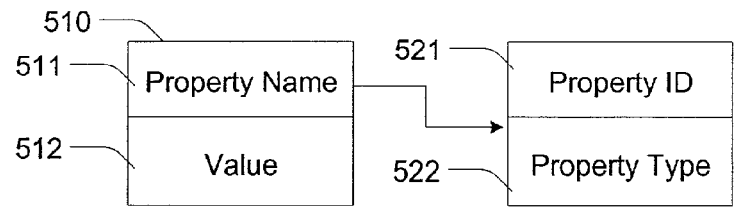
FIG. 5 illustrates a message property having a property name decomposed into a property ID and property type, in accordance with one implementation of the present invention.
Figure 6:
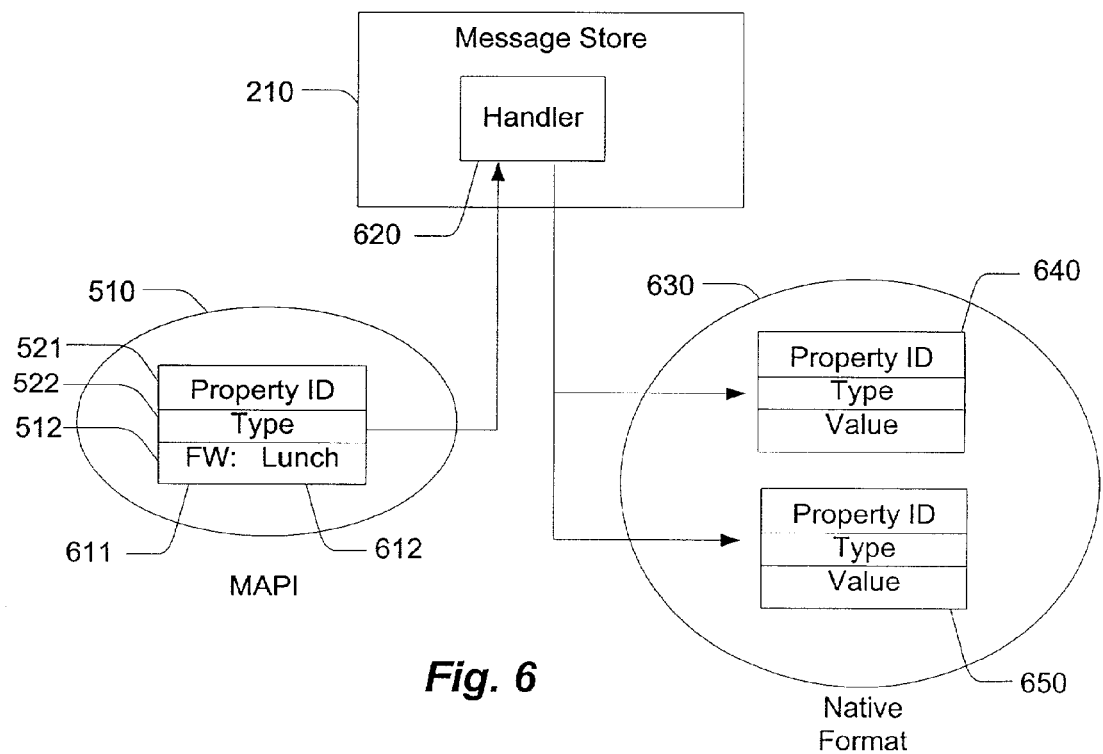
FIG. 6 illustrates the conversion of a field requiring multiple handler translations, in accordance with one implementation of the present invention.

FIGS. 5 and 6 are functional block diagrams conceptually illustrating a translation of a MAPI message property 510 to a Windows CE database message property 630. MAPI message property 510 is a software component including a property name 511 field and a value 512 field. An example of the property name 511 might be PR_SUBJECT, which identifies the property (see FIG. 6), while the corresponding value field 512, might be the text string or "payload" of the subject line of the message. FIG. 5 illustrates a decomposition of the property name 511 into an ID 521 and a property type 522. The message store 210 is programmed to resolve the property name 511 into the ID 521 and the type 522, allowing it to determine which handler to instantiate to conduct the translation of the value 512.

FIG. 6 illustrates the translation of a MAPI message property 510 to a Windows CE database message property 630 in conceptual detail. MAPI message property 510 is viewed with the property name 511 decomposed into an ID field 521 and a type 522. Also shown is the value 512. Due to the nature of the translation as described below, Windows CE database message property 630 includes message property prefix 640 and message property base 650.

In operation, the message store 210 determines the appropriate handler to call to translate the MAPI message property 510 based on the property type 522. The message store 210 would then instantiate the handler registered (see FIG. 4 and accompanying discussion) to translate the value 512. In this example, PR_SUBJECT handler 620 has been created to translate the property 510. If there are no other specific fields to be translated, the handler property 510 returns the now-translated data to the message store 210 for storage.

In some circumstances, translating a single property may result in two or more translated properties (e.g., 640 and 650). For example, often the "subject" property of a message includes extraneous text that has been added through multiple transmissions, such as the text "Fw" for messages that have been forwarded, or the text "Re" for messages that have been replied to. In such a case, the handler 620 may split the single property 510 into two properties: one property 640 containing the actual subject text, and another property 650 containing the "Fw" or "Re" text. In this way, a message form 250 may display several messages properly sorted by "subject" (e.g., by property 640) without grouping all the messages that have been forwarded together and all the messages that have been replied to together.

Figure 7:
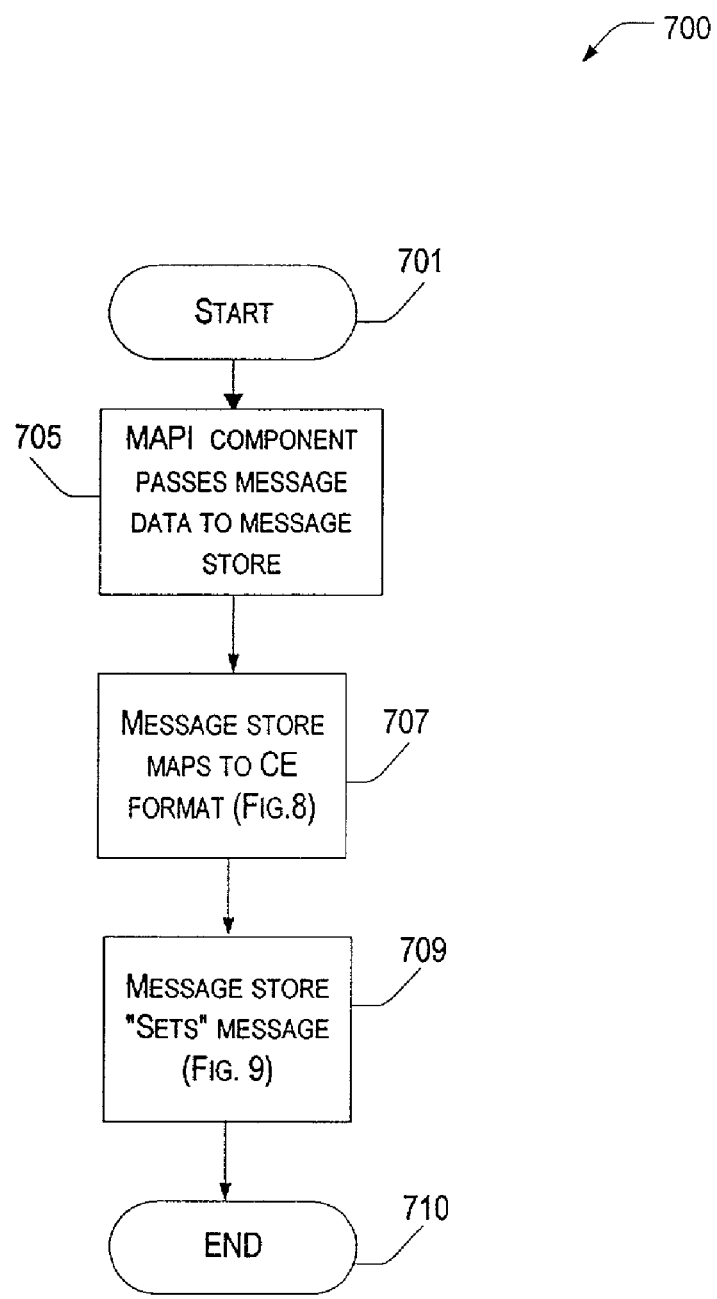
FIG. 7 is a logical flow diagram illustrating a process for setting properties of a message within a centralized data store, in accordance with one implementation of the present invention.

FIG. 7 is a logical flow diagram illustrating a process for "setting" properties stored in one format by a component that communicates in another format. In describing FIG. 7, reference is made to the system 200 described in conjunction with FIG. 2. Method 700 enters at starting block 701, where a MAPI component attempts to store or modify a property. For example, a SMS transport may attempt to modify a property such as PR_SENT_TIME on a message object. Message data may be presented to the message store 210 by any one of many components (e.g., MAPI components) such as transports, forms, the main application, or the like. An example might be a SMS transport 231 receiving SMS message data or IMAP message data being received by IMAP transport 232, etc.

The process begins at block 705 where one or more components, such as the transport component 230, passes the message data to the message store 210. At block 707, the message store 210 maps the message data from MAPI format to a format consistent with the data store 220. The mapping process is illustrated in detail in FIG. 8 and described below. Briefly described, and referring to FIGS. 2 and 4, the mapping process involves the message store 210 determining the property type of each message property, consulting the handler registration table 420, and calling the appropriate handler to translate the message properties from MAPI format to Windows CE database format.

At block 709 message store 210 stores the translated message properties in data store 220. The storage process is illustrated in detail in FIG. 9 and described below. Briefly described, and referring to FIGS. 2 and 3, during the storage process, the message store 210 determines which of the tables, (sub-folder tables 310, message property table 320), or the file system 330 to deposit each translated property into, and then stores the information there.

At block 710, processing ends. At this point the message data has been stored in Windows CE database format. It should be noted that this process may be used by any component in the messaging system 200 that communicates with the message store in a format other than in a format consistent with data store 220. For example, when a message is composed (referring to FIG. 2), it is composed in a MAPI format and saved via the message store 210, in Windows CE database format, in data store 220, utilizing the just-described process.

Figure 8:
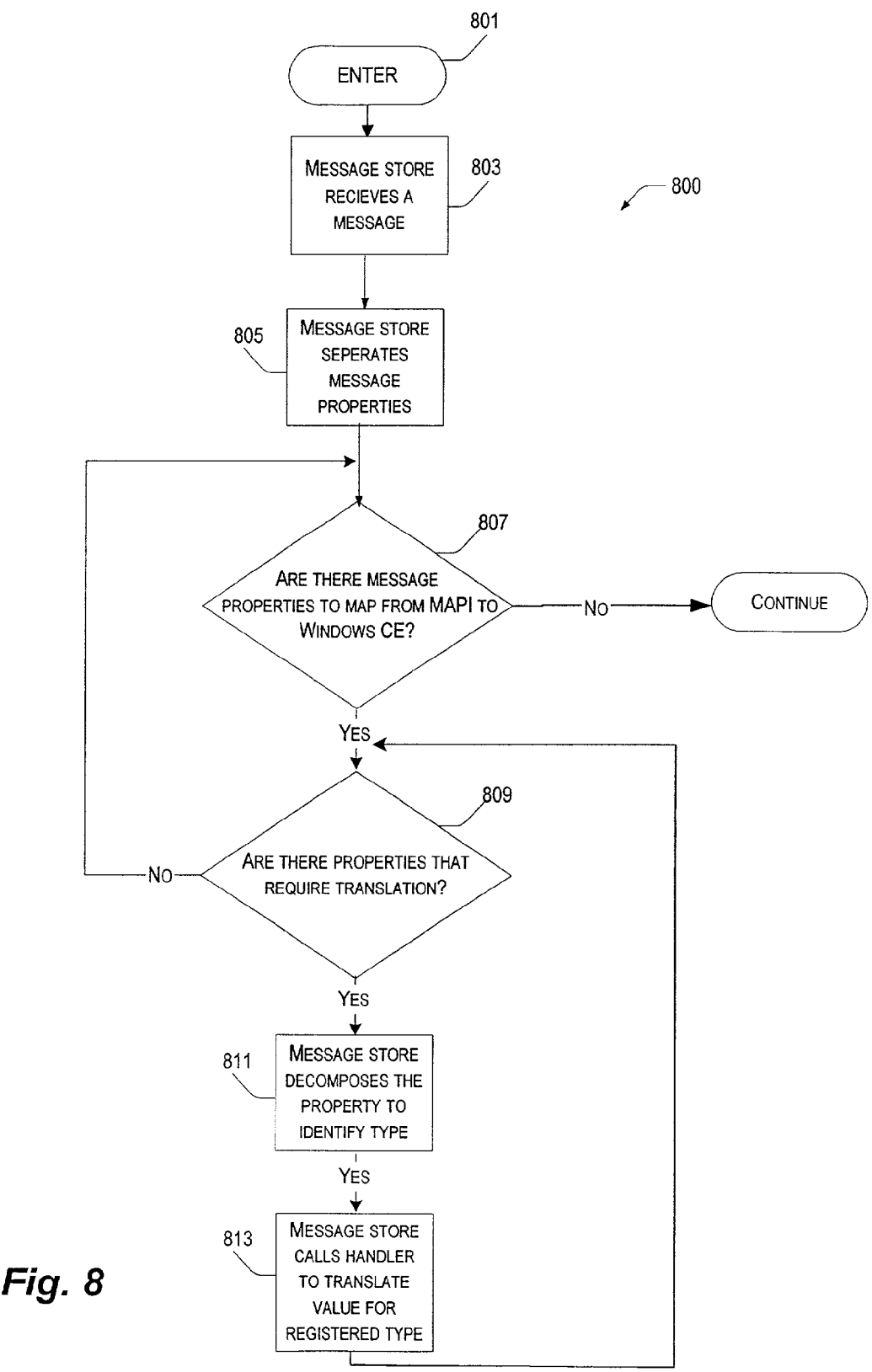
FIG. 8 is a logical flow diagram illustrating a process for translating properties from a general use format to a data storage format, in accordance with one implementation of the present invention.

FIG. 8 is a logical flow diagram illustrating in greater detail a process for performing a mapping operation using the protocol disclosed. In describing FIG. 8, reference is made to the system and process described in conjunction with FIGS. 2, 5, 6, and 7. Method 800 enters at starting block 801 where message data is passed to the message store 210.

At block 803 the message store 210 receives message data. The message data arrives from other message system components in MAPI format. At block 805 message store 210 separates the message properties into mapped and unmapped message properties. Unmapped message properties are organized by priority and one message property is identified for mapping.

At block 807, message store 210 determines whether the message properties need to be mapped from MAPI to Windows CE database format. If no message properties remain to be mapped, then the process advances to block 815. If any message properties have not yet been mapped from MAPI to Windows CE database format, then the process advances to block 809.

At block 809 the message store receives a first property and determines if it requires translation from MAPI to Windows CE database format. If the property does not require translation, then the process returns to block 805. If the property has not been translated from MAPI to Windows CE database format, then the process advances to block 811.

At block 811 the message store 210 decomposes the property field 511, into an ID field 521 and a type field 522, to determine the appropriate handler to call. At block 813 the message store 210 determines which handler to call based upon the type field 522. The message store 210 then instantiates the handler which translates the value field 512. In the event the value field 512 is a complex field (as detailed above and illustrated in FIG. 6), the handler may translate the field into two or more other properties. The process then returns to block 809 to determine if there are additional properties to translate. If there are more properties to translate, the process proceeds to block 811 again. If there are not additional properties to be translated then the process proceeds to block 807.

At block 807, if all message properties have been translated then the process advances to block 815. At block 815 processing ends. At this point the message data has been received by the message store and mapped to Windows CE database format.

Figure 9:
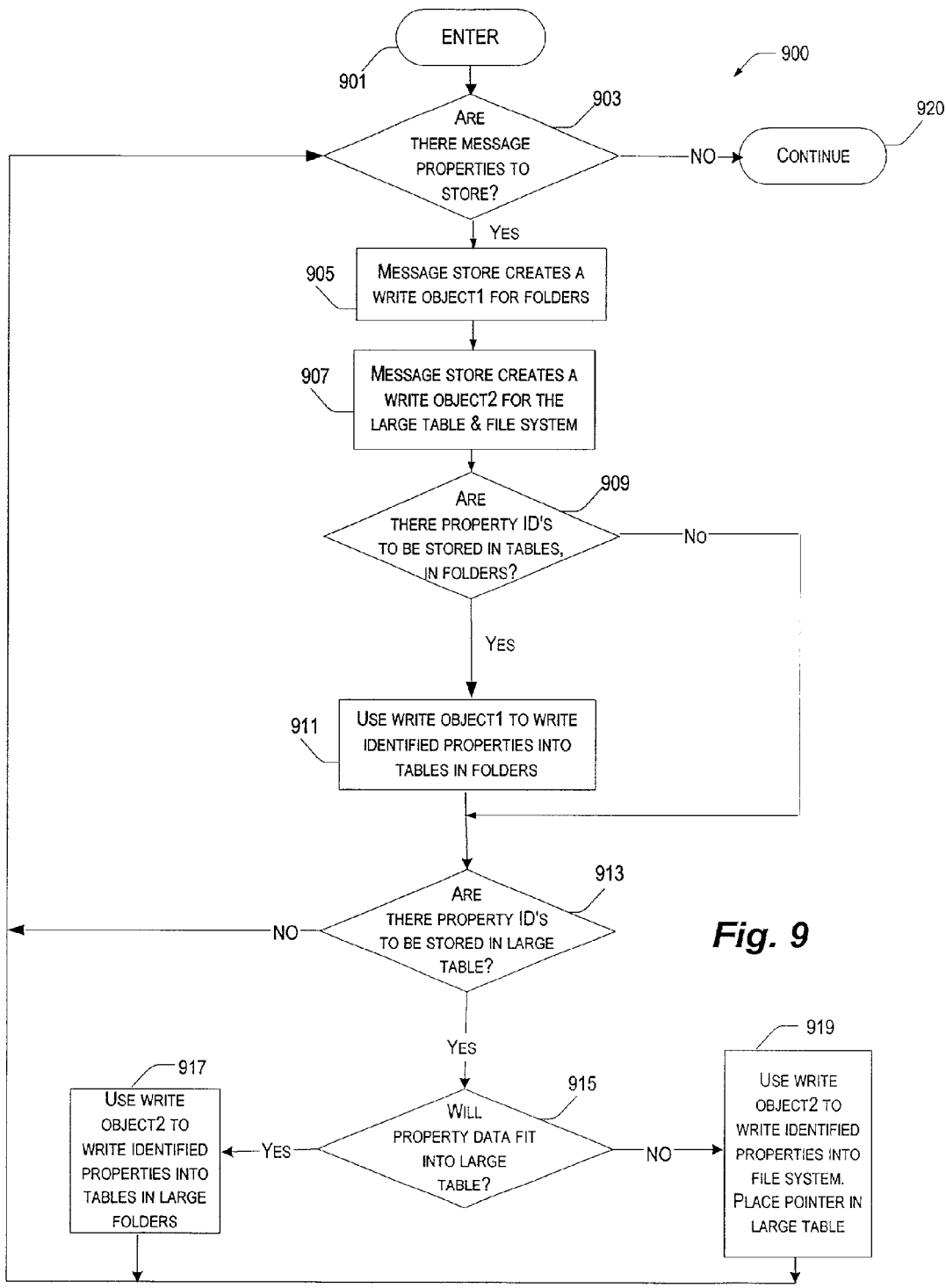
FIG. 9 is a logical flow diagram illustrating a process for a storing translated properties, in accordance with one implementation of the present invention.

FIG. 9 is a logical flow diagram illustrating a process for storing information in the data store in accordance with the invention. In describing FIG. 9, reference is made to the system and process described in conjunction with FIGS. 2, 3 and 7. Method 900 enters at starting block 901 where message store 210 prepares to store data previously mapped from MAPI format to Windows CE database format.

At decision block 903, message store 210 determines if there are message properties to store in data store 220. If all message properties have been stored then the process advances to block 920 and returns to block 709 of the setting process 700 of FIG. 7. If any message properties have not been stored, the process advances to block 905.

At block 905, message store 210 creates a WRITE object1 to perform the actual write of appropriate message properties to the appropriate tables in sub-folder tables 310. The message store 210 then populates the WRITE object1 with the properties corresponding to the message data that has been received.

At block 907, message store 210 creates a WRITE object2 to write the appropriate message files to the appropriate locations in message property table 320 or file system 330. The message store 210 then populates WRITE object2 with the message data corresponding to the properties that reside in the message property table 320.

At block 909 message store 210 determines if WRITE object1 contains any properties to be stored in tables in the sub-folder tables 310 component. If there are not any properties to be stored in the tables in sub-folder tables 310, then the process advances to block 913. If there are properties to be stored in the tables in sub-folder tables 310 then the process advances to block 911. At block 911, message store 210 directs WRITE object1 to write the identified properties into the tables in sub-folder tables 310.

At block 913 the message store 210 determines if WRITE object2 contains any properties to be stored in the message property table 320 component. If there are not any properties to be stored in the message property table 320 then the process advances to block 903. If there are properties to be stored in the message property table 320 then the process advances to block 915. At block 915, message store 210 determines if the property data will fit into the allocated space available in message property table 320. If there is not enough space available to store the message properties, then the process advances to block 919. If there is enough space available in the message property table 320 to store the message properties then the process advances to block 917.

At block 917, message store 210 directs WRITE object2 to write the identified properties into the message property table 320. At block 919 message store 210 directs WRITE object2 to write identified properties into file system 330. Additionally, WRITE object2 inserts apointer in the message property table 320 to the location of the file containing the property (see FIG. 3 and discussion above).

Next, the process returns to block 903 where it determines if there are any more message properties to store. If there are message properties to store the process repeats as described above. If there are not any properties to store the process advances to block 920 and returns to the main program in FIG. 7. At this point the message data has been received and stored by the data store 220 in Windows CE database format.

Figure 10:
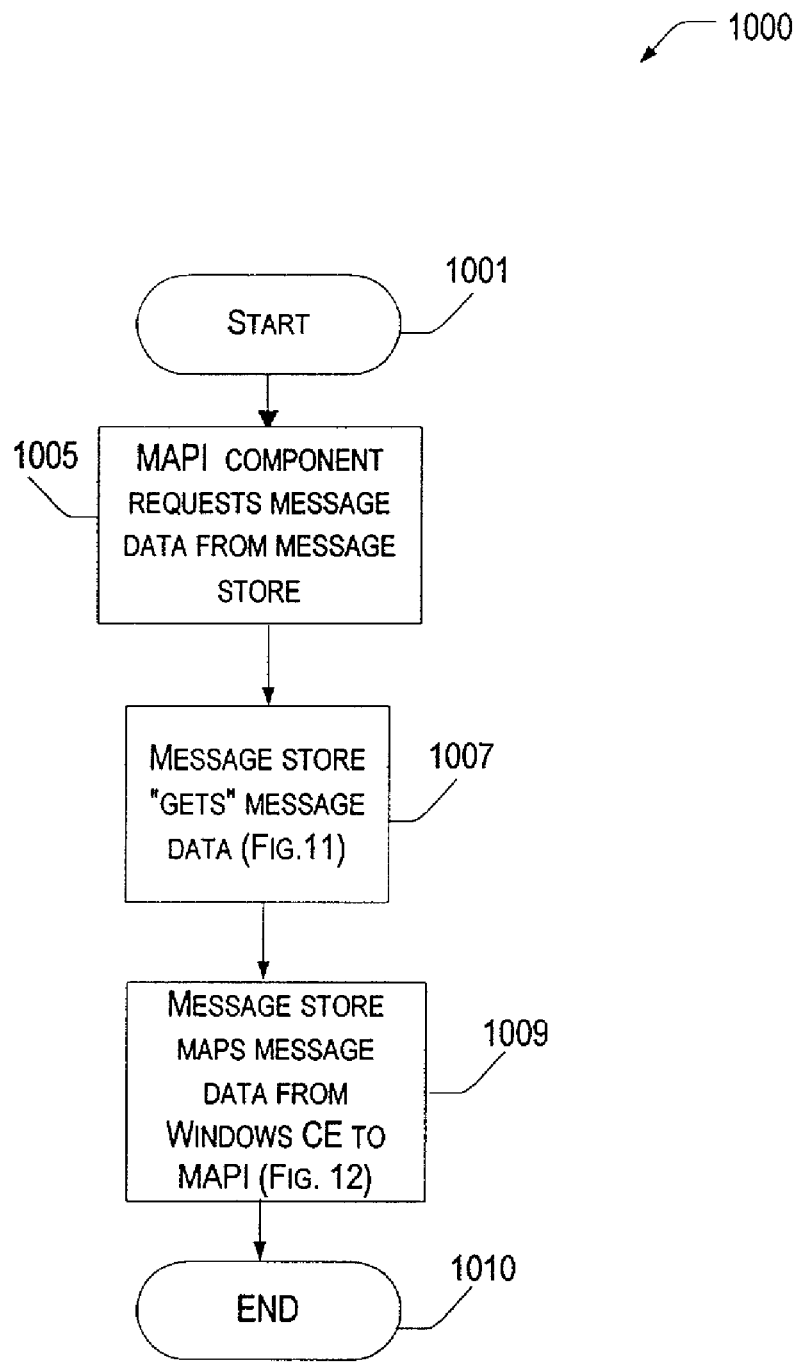
FIG. 10 is a logical flow diagram illustrating a process for getting properties of a message within a centralized data store, in accordance with one implementation of the present invention.

FIG. 10 is a logical flow diagram generally illustrating a process for retrieving message properties from the data store. In describing FIG. 10, reference is made to the system described in conjunction with FIG. 2. Method 1000 enters at starting block 1001, where message data typically is already stored, such as, for example, in the data store 220. The data typically would also be in a format consistent with the operating system, for example, Windows CE database format. Message data may be requested by one of many components (e.g., MAPI devices) such as transports, forms, the mail application, or the like. Examples of components making such requests might be SMS transport 231 or SMTP transport 232, etc.

Figure 11:
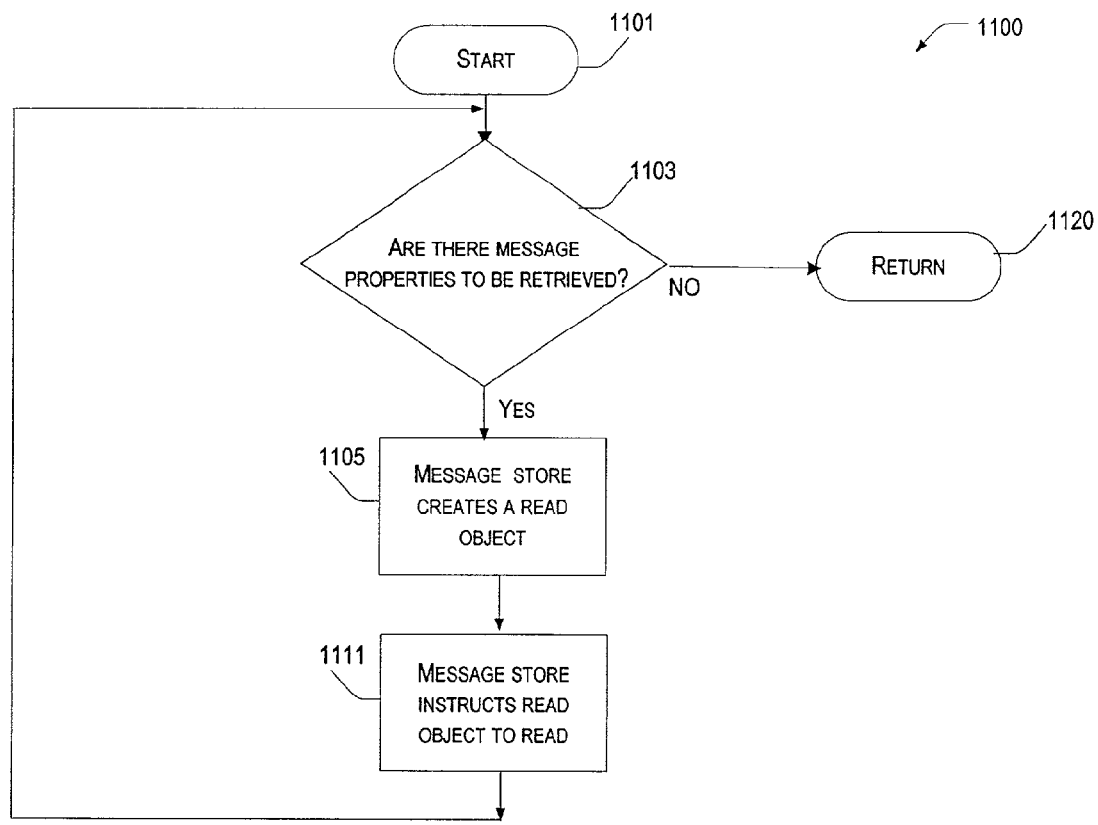
FIG. 11 is a logical flow diagram illustrating a process for retrieving properties from storage, in accordance with one implementation of the present invention.

The process begins at block 1005 where one or more components, such as the transport component 230, issues a message request to message store 210. At block 1007 message store 210 retrieves the translated message properties from data store 220. The operations performed while retrieving the data are illustrated in FIG. 11 and described below. Briefly described, and referring to FIGS. 2 and 3, the message store 210 determines which of the tables, sub-folder tables 310, message property table 320, or file system 330 to retrieve each translated property from and then retrieves that data.

At block 1009 message store 210 maps the message data from the format consistent with data store 220 to the format consistent with the other components, MAPI in this example. The mapping process is illustrated in detail in FIG. 12 and described below. Briefly described and referring to FIGS. 2 and 4, the mapping process involves the message store 210 determining the property type of each message property, consulting the handler registration table 420 to identify the appropriate handler, and calling the appropriate handler to translate the message properties from Windows CE database format to MAPI format.

At block 1010, processing ends. At this point the message data has been retrieved and provided, in MAPI format, to the requesting component. It should be noted that this process is used anytime data is retrieved for the messaging system 200 and is not in a format consistent with data store 220. For example, when a message is transmitted outside of the mobile device (referring to FIG. 2) utilizing transports 230, the message is retrieved in a Windows CE database format from the data store 220 and mapped via the message store 210 to MAPI format, utilizing the just described process.

FIG. 11 is a logical flow diagram illustrating a process for retrieving message properties from the data store 220 using the protocol disclosed. In describing FIG. 11, reference is made to the system and process described in conjunction with FIGS. 2, 3 and 10. Method 1100 enters at starting block 1101 where data store 220 contains message data previously mapped from MAPI format to Windows CE database format.

At block 1103, message store 210 determines if there remains message properties to retrieve from data store 220. If all message properties have been retrieved, the process advances to block 1120 and returns to block 1007 of process 1000 illustrated in FIG. 10. If any message properties have not been retrieved, then the process advances to block 1105. At block 1105 message store 210 creates a READ object to read the appropriate message files from the appropriate tables in sub-folder tables 310 or message property table 320, or to read the appropriate message files from the file system 330. The message store 210 then populates the READ object with the properties to retrieve.

At block 1111 message store 210 directs the READ object to read identified properties from the tables in sub-folder tables 310 and message property table 320, and to read identified properties from the file system 330.

Next, the process advances to block 1103 where it determines if there are any more message properties to retrieve. If there are message properties to retrieve, the process returns to block 1105 (see above discussion). If there are not any properties to retrieve, the process advances to block 1120 and returns to block 1007 of the main program in FIG. 10. At this point the message data has been retrieved and returned to the message store 210 in Windows CE database format.

Figure 12:
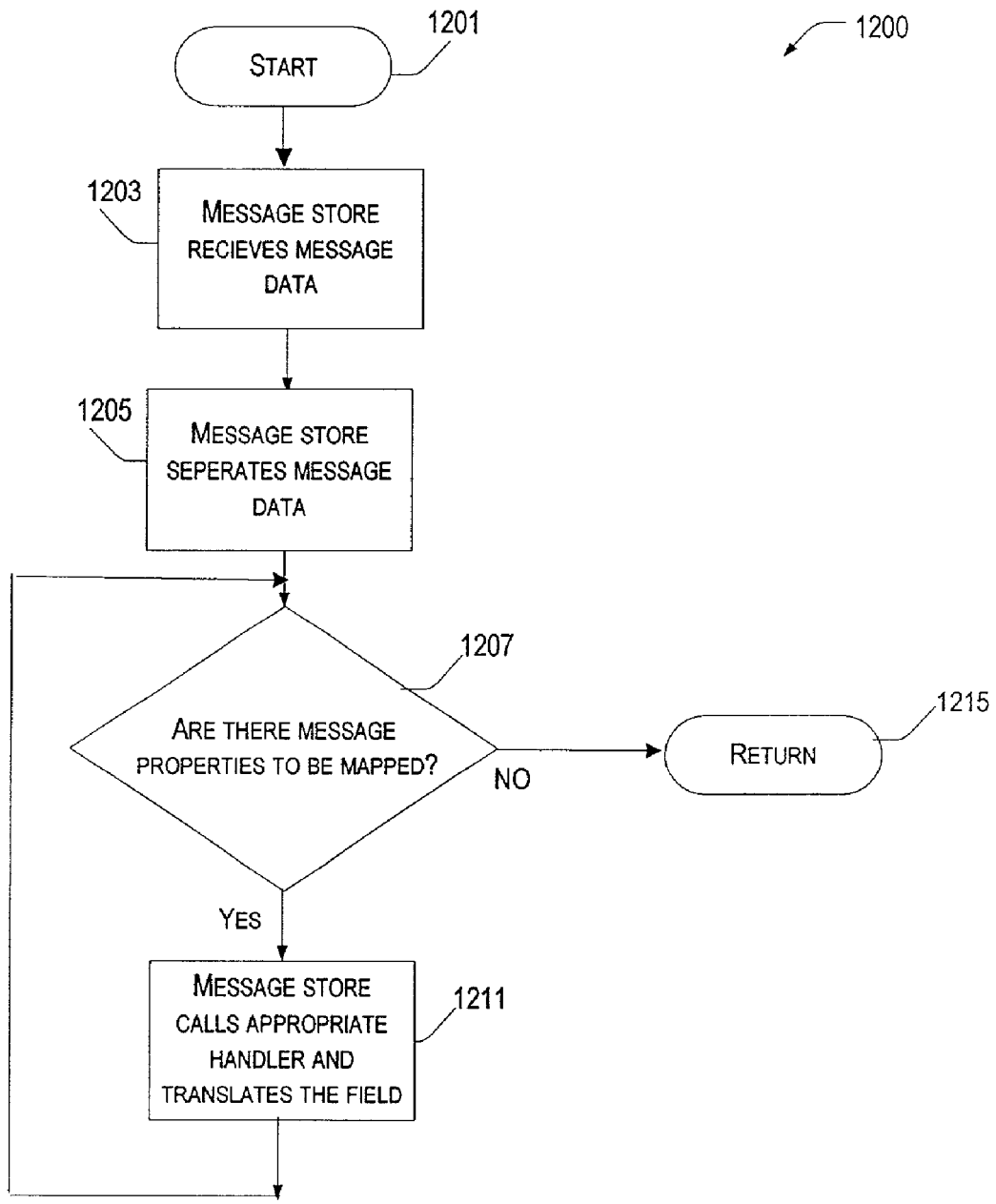
FIG. 12 is a logical flow diagram illustrating a process for translating properties from a data storage format to a general use format, in accordance with one implementation of the present invention.

FIG. 12 is a logical flow diagram generally illustrating a process for performing a mapping operation using the protocol disclosed. In describing FIG. 12, reference is made to the system and process described in conjunction with FIGS. 2, 5, 6, and 10. Method 1200 enters at starting block 1201 where message data is ready to be retrieved by the message store 210.

At block 1203 the message store 210 receives message data. The message data arrives from the data store 220 in Windows CE database format. At block 1205 message store 210 separates the message properties into mapped and unmapped message properties. Unmapped message properties are organized by priority and one message property is identified for mapping.

At block 1207 message store 210 determines if all the message properties have been mapped from Windows CE database format to MAPI. If all message properties have been mapped, the process advances to block 1215. If any message properties have not been mapped from Windows CE database format to MAPI, then the process advances to block 1211.

At block 1211, beginning with a first unmapped property, the message store 210 queries the type field 522, to determine the appropriate handler to call. The message store then instantiates the handler called and the handler translates the data in the value field 512 as appropriate for that handler. The process then returns to block 1207 to determine if there remain any further properties to translate. If there are more properties to translate the process performs the operation at block 1211 again. If there are not additional properties to be translated then the process ends. The process ends when it is determined at, at block 1207 that no further properties remain to be translated.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A computer-readable medium having computer-executable components for storing and distributing a message in a mobile device, comprising:
   a transport component included in the mobile device that is configured to communicate with external devices according to a transport protocol associated with the transport component, and is further configured to communicate with local components according to a first format for distribution of the message in the mobile device, wherein the first format is different from the transport protocol;
   a messaging component included in the mobile device that is configured to provide a user access to the message, and is further configured to communicate with local components according to the first format;
   a data store included in the mobile device that is configured to provide for storage of the message according to a second format, wherein the second format corresponds to a native storage format of the mobile device and is different from the first format and the transport protocol; and
   a storage component included in the mobile device that is configured to communicate with the transport component and the messaging component according to the first format, and is further configured to translate the message from the first format to the second format for storage in the data store.

2. The computer-readable medium of claim 1, wherein the messaging component comprises a mail application.

3. The computer-readable medium of claim 1, wherein the messaging component comprises a message form.

4. The computer-readable medium of claim 1, wherein the messaging component comprises a message transport.

5. The computer-readable medium of claim 1, further comprising another messaging component that communicates with the messaging component and the storage component using the first format.

6. The computer-readable medium of claim 1, wherein the storage component further comprises at least one handler that is configured to perform the translation of properties of the message from the first format to the second format.

7. The computer-readable medium of claim 6, wherein the handler is registered to translate a particular type of property, and wherein the storage component makes use of the handler if a property of the message corresponds to the particular type of property.

8. The computer-readable medium of claim 6, wherein the handler is further configured to create a new property from a property passed to the storage component.

9. The computer-readable medium of claim 8, wherein the handler is further configured to create an additional new property based on the property passed to the storage component.

10. A computer-readable medium, having computer executable-instructions for storing and distributing a message in a mobile device, comprising:
    medium is associated with a transport protocol;
       distributing the message within the mobile device according to a first format, wherein the first format corresponds to a standard format for distribution of the message in the mobile device and is different from the transport protocol;
       translating the message from the first format to second format for storage, wherein the second format corresponds to a native storage format of the mobile device and is different from the first format and the transport protocol; and
       storing the message in the data store in the second format, wherein storing the message includes storing a property associated with the message.

11. The computer-readable medium of claim 10, wherein the property includes a descriptor that distinguishes the property from other properties.

12. The computer-readable medium of claim 11, wherein the descriptor comprises a property type.

13. The computer-readable medium of claim 11, wherein translating the message further comprises passing message data to a handler for processing, the handler being associated with the descriptor.

14. The computer-readable medium of claim 13, wherein the handler is registered to process data of a type associated with the descriptor.

15. The computer-readable medium of claim 14, wherein the handler is further configured to convert the property from the first format into the second format.

16. The computer-readable medium of claim 15, wherein the handler is further configured to translate the property into at least one other property and the at least one other property conforms to the second format.

17. The computer-readable medium of claim 10, wherein storing the message in the data store comprises storing message data in a plurality of tables.

18. The computer-readable medium of claim 17, wherein each of the plurality of tables corresponds to a message folder.

19. The computer-readable medium of claim 17, wherein one of the plurality of tables is configured to contain certain properties, and another of the plurality of tables is configured to contain certain other properties.

20. The computer-readable medium of claim 17, wherein a table within the plurality of tables is configured as an overflow mechanism for another of the tables within the plurality of tables.

21. The computer-readable medium of claim 20, wherein the overflow mechanism comprises a file system.

22. A computer-readable medium, having computer executable-instructions for storing and distributing a message in a mobile device, comprising:
   storing a message in a data store according to a native storage format for the mobile device, wherein storing the message includes storing a property associate with the message;
   retrieving the message front the data store;
   translating the retrieved message to a standard distribution format different from the native storage format; and
   distributing the message within the mobile device according to the standard distribution format.

23. The computer-readable medium of claim 22, further comprising passing the translated message to a component associated with a request for the message.

24. The computer-readable medium of claim 22, wherein retrieving the message from the data store further comprises retrieving data from at least one table in a plurality of tables.

25. The computer-readable medium of claim 22, wherein the property includes a descriptor that distinguishes the property from other properties.

26. The computer-readable medium of claim 25, wherein the descriptor comprises a property type.

27. The computer-readable medium of claim 25, wherein translating the message further comprises passing message data to a handler for processing, the handler being associated with the descriptor.

28. The computer-readable medium of claim 27, wherein the handler is registered to process data of a type associated with the descriptor.

29. The computer-readable medium of claim 28, wherein the handler is further configured to convert the property from the standard distribution format into the native storage format.

30. The computer-readable medium of claim 29, wherein the handler is further configured to translate the property into at least one other property and the at least one other property conforms to the native storage format.

* * * * *